United States Patent

Tanahashi

Patent Number: 5,283,749
Date of Patent: Feb. 1, 1994

[54] DEVICE FOR OUTPUTTING MACHINE CONTROL PROGRAMS IN RESPONSE TO EXTERNAL PROGRAM SELECTING SIGNALS

[75] Inventor: Yasuo Tanahashi, Nagoya, Japan

[73] Assignee: Brother Kogyo Kabushiki Kaisha, Nagoya, Japan

[21] Appl. No.: 795,382

[22] Filed: Nov. 21, 1991

[30] Foreign Application Priority Data

Nov. 24, 1990 [JP] Japan .................. 2-319564

[51] Int. Cl.$^5$ .............................................. G06F 15/46
[52] U.S. Cl. .......................... 364/474.01; 364/474.22
[58] Field of Search ...................... 364/474.01, 474.02, 364/474.22–474.27, 191–194, 188, 189, 474.28

[56] References Cited

U.S. PATENT DOCUMENTS

| 4,794,541 | 12/1988 | Kiya .................. 364/474.01 |
| 4,831,540 | 5/1989 | Hesser ............... 364/474.01 |
| 5,031,106 | 7/1991 | Tanahashi et al. ... 364/474.28 |

FOREIGN PATENT DOCUMENTS

| 61-175705 | 8/1986 | Japan .............. 364/474.02 |
| 63-184105 | 7/1988 | Japan .............. 364/474.01 |

Primary Examiner—Jerry Smith
Assistant Examiner—Steven R. Garland
Attorney, Agent, or Firm—Oliff & Berridge

[57] ABSTRACT

A control device for outputting a selected one of machine control programs in response to program selection signals received from an external device, the device including a memory for storing the programs in relation to respective program identification numbers, a signal input portion having terminals for receiving the respective program selection signals, an arrangement for correlating the identification numbers of selected ones of the programs with respective code values corresponding to respective combinations of states of the program selection signals, a correlation memory for storing a relationship between the identification numbers of the selected programs and the code values, an encoder for encoding the combination of states of the program selection signals received at the terminals into the corresponding code value, an arrangement for reading one of the program identification numbers which corresponds to the code value obtained by the encoder, and an arrangement for outputting to the machine one of the selected programs whose number has been read.

11 Claims, 5 Drawing Sheets

FIG. 2

| ADDRESS NO. | PROGRAM NO. |
|---|---|
| 0 | — |
| 1 | 0042 |
| 2 | 0420 |
| 3 | 2719 |
| 4 | 7934 |
| 5 | 4825 |
| 6 | 0924 |
| 7 | 0825 |
| 8 | |
| 9 | |
| 10 | |
| 11 | |
| 12 | |
| 13 | |
| 14 | |
| 15 | |

| S1 | S2 | S3 | S4 | CODE VALUE |
|---|---|---|---|---|
| L | L | L | L | 0 |
| L | L | L | H | 1 |
| L | L | H | L | 2 |
| L | L | H | H | 3 |
| L | H | L | L | 4 |
| L | H | L | H | 5 |
| L | H | H | L | 6 |
| L | H | H | H | 7 |
| H | L | L | L | 8 |
| H | L | L | H | 9 |
| H | L | H | L | 10 |
| H | L | H | H | 11 |
| H | H | L | L | 12 |
| H | H | L | H | 13 |
| H | H | H | L | 14 |
| H | H | H | H | 15 |

DEVICE FOR OUTPUTTING MACHINE CONTROL PROGRAMS IN RESPONSE TO EXTERNAL PROGRAM SELECTING SIGNALS

BACKGROUND OF THE INVENTION

1. Field of the Invention

The present invention relates to a program input/output control device, and more particularly to a control device for outputting a selected one of a plurality of machine control programs to a workpiece processing machine such as a numerically controlled machine, in response to program selection signals received from an external device.

2. Discussion of the Prior Art

A known numerically controlled machine (NC machine) is operated according to a selected one of machine control programs such as machining or other processing programs, which are stored in a memory such that the programs are selectable with respective program numbers. The selected machine control program is outputted to the NC machine for performing a corresponding operation to machine or otherwise process a workpiece. The desired machine control program is selected by entering the corresponding program number through an operator's control panel of the NC machine.

In an unmanned or unattended, fully automatic manufacturing line, however, the machine control programs (NC programs) for each NC machine are not designated by the machine operator through the operator's control panel of the NC machine, but are automatically selected in response to program selection signals received from an external device, so-called a sequence controller, which is adapted to identify different types of workpieces supplied to the machine, by using a suitable sensor. The program selection signals are sent to a numerical control device of the NC machine, so that the workpieces are machined or otherwise processed according to the corresponding machine control programs.

Conventionally, the program numbers representing the respective machine control programs are directly designated by corresponding combinations of the low/high levels of program selection signals sent from an external device to a plurality of program selection terminals of the numerical control device of the NC machine. In this direct designation system, the required number of the signal lines connected to the program selection terminals tends to be considerably large, particularly where the number of the machine control programs available is relatively large. If the operation programs are identified by program numbers 1 through n, the required number of combinations of the low/high levels of the program selection signals is equal to "n", and therefore the required number of the signal lines (program selection terminals) is equal to $\log_2 n$. Where n=9999, for example, a total of 14 program selection terminals (signal lines) are required for permitting the program selection signals to identify the machine control programs. Consequently, the cost of the overall system including the program selection terminals, signal line cables and connectors tends to be increased.

Although the number of the machine control programs available for use is equal to "n", the number of the machine control programs which are actually used or expected to be used during a given period for processing the workpieces on the relevant NC machine is usually considerably smaller than "n". In this sense, the signal lines and the corresponding program selection terminals used in the conventional system are not effectively utilized.

SUMMARY OF THE INVENTION

The present invention was developed in the light of the applicant's above finding on the known machine control device. It is therefore an object of the present invention to provide a control device for outputting to a workpiece processing machine a selected one of machine control programs, which device has a reduced number of program selection terminals for selecting the machine control programs.

The above object may be accomplished according to the principle of the present invention, which provides a control device for outputting to a workpiece processing machine a selected one of machine control programs in response to program selection signals received from an external device, comprising: (a) a program memory for storing a plurality of machine control programs, in relation to respective program numbers which identify the machine control programs, respectively; (b) a signal input portion having a plurality of program selection terminals for receiving respective program selection signals from the external device; (c) correlating means for correlating said program numbers of selected ones of said machine control programs with respective code values corresponding to respective combinations of states of said program selection signals; (d) correlation memory means for storing a relationship between said program numbers of said selected ones of the machine control programs and said code values which are obtained by said correlating means; (e) encoding means for encoding the combination of states of said program selection signals which are received at said program selection signals, into a corresponding one of the code values; (f) program number reading means for reading one of said program numbers which corresponds to said corresponding one code value obtained by said encoding means; and (g) program output means for outputting to the machine one of the selected machine control programs whose program number has been read by the program number reading means.

In the present control device, machine control programs stored or to be stored in the program memory are identified by respective program numbers, and a desired one of the machine control programs is outputted to the machine, depending upon the combination of states of the program selection signals received at the program selection terminals. However, the program selection signals do not directly represent the program numbers of the desired machine control programs. The desired one of the machine control programs is selected or called in the following manner, depending upon the states of the individual program selection signals.

More specifically, the program numbers of the selected or desired ones of the machine control programs are correlated with respective code values which correspond to respective different combinations of states of the program selection signals received by the program selection terminals. For storing data representative of the relationship between the program numbers of the selected machine control programs and the corresponding code values, there is provided correlation memory means. In operation of the present control device, the combination of states of the program selection signals received by the terminals is encoded by the encoding means, into the corresponding code value, and one of the program numbers which corresponds to the code value obtained by the encoding means is read by the program number reading means, so that the machine control program whose number has been read is outputted to the machine. It is preferred that the machine control program to be outputted is once stored as an active program in an active memory in the control device so that the program is sequentially fed to the machine.

The present arrangement does not require the program selection signals to directly represent the program identification numbers, but utilizes the above-indicated relationship stored in the correlation memory means, so that the different combinations of states of the program selection signals are correlated with the respective program identification numbers, to identify the desired machine control programs selected from among the programs stored in the program memory, depending upon the states of the program selection signals. Therefore, the required number of the program selection terminals (program selection signal lines) need not correspond to the largest program identification number available, but may be determined corresponding to the number of the selected machine control programs which are actually used or highly expected to be used. According to the instant arrangement, the system including the terminal board of the control device and the associated signal line cables and connectors can be significantly simplified and and available at an accordingly reduced cost.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
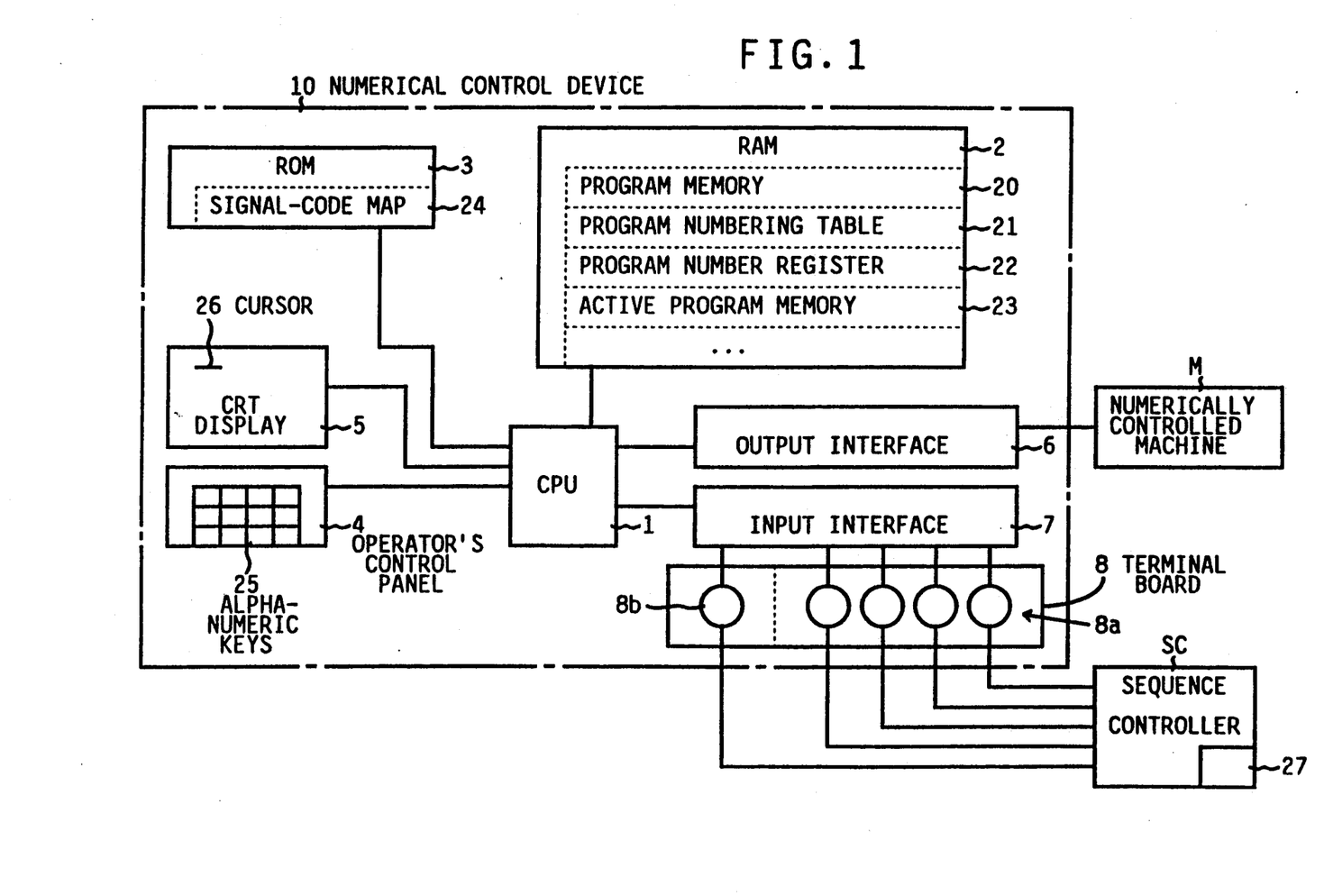
FIG. 1 is a schematic block diagram illustrating a control device for outputting machine control programs in the form of a numerical control device constructed according to one embodiment of this invention.

Referring first to FIG. 1, a control device in the form of a numerical control device 10 is connected to a numerically controlled machine M adapted to perform machining or other processing operations on different types of workpiece, according to respective machine control programs such as machining programs.

The numerical control device 10 incorporates a central processing unit (CPU) 1, a random-access memory (RAM) 2, a read-only memory (ROM) 3, an operator's control panel 4, a display 5, an output interface 6, an input interface 7 and a terminal board 8. The CPU 1 includes arithmetic and logic circuits and interacts with the elements 2-7 to control the operation of the numerical control device 10.

Figure 2:
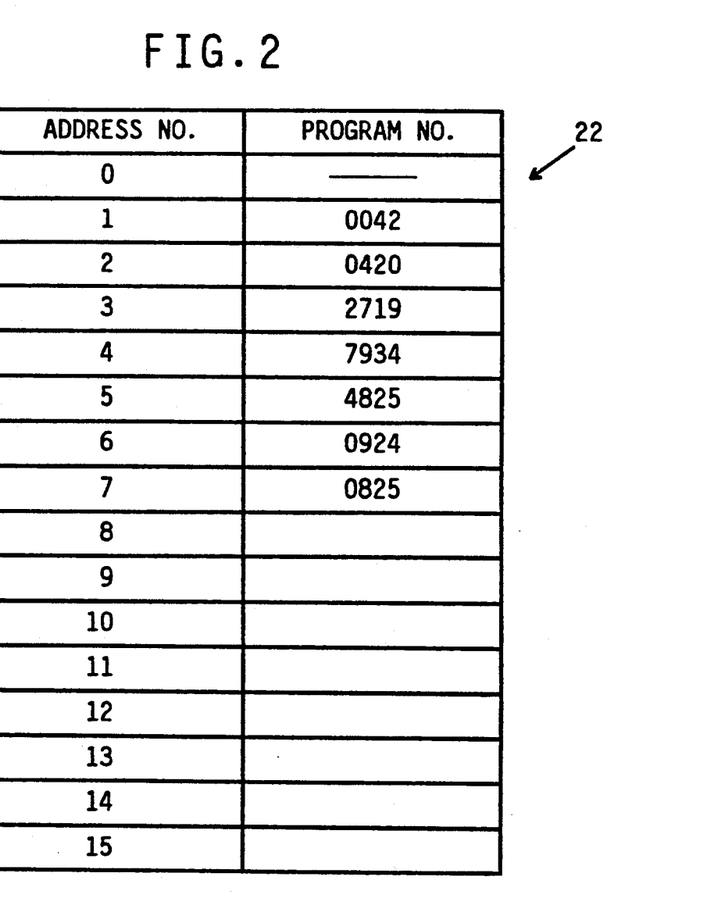
FIG. 2 is a view indicating a program number register used in the numerical control device of FIG. 1.

The RAM 2, which is a battery-backup type, includes a PROGRAM memory 20, a PROGRAM NUMBERING table 21, a PROGRAM NUMBER register 22 as shown in FIG. 2, and an ACTIVE PROGRAM memory 23. The PROGRAM memory 20 functions to store a multiplicity of machine control programs, and the PROGRAM NUMBERING table 21 stores data representative of a relationship between the individual machine control programs stored in the memory 20 and the respective program numbers which are used to identify the machine control programs. The PROGRAM NUMBER register 22 is used to store data representative of a relationship between the program numbers identifying desired programs selected from among the machine control programs stored in the PROGRAM memory 20, and the corresponding code values which will be described in detail. The ACTIVE PROGRAM memory 23 functions to store active machine control programs which are actually outputted to the numerical control machine M.

Figure 4:
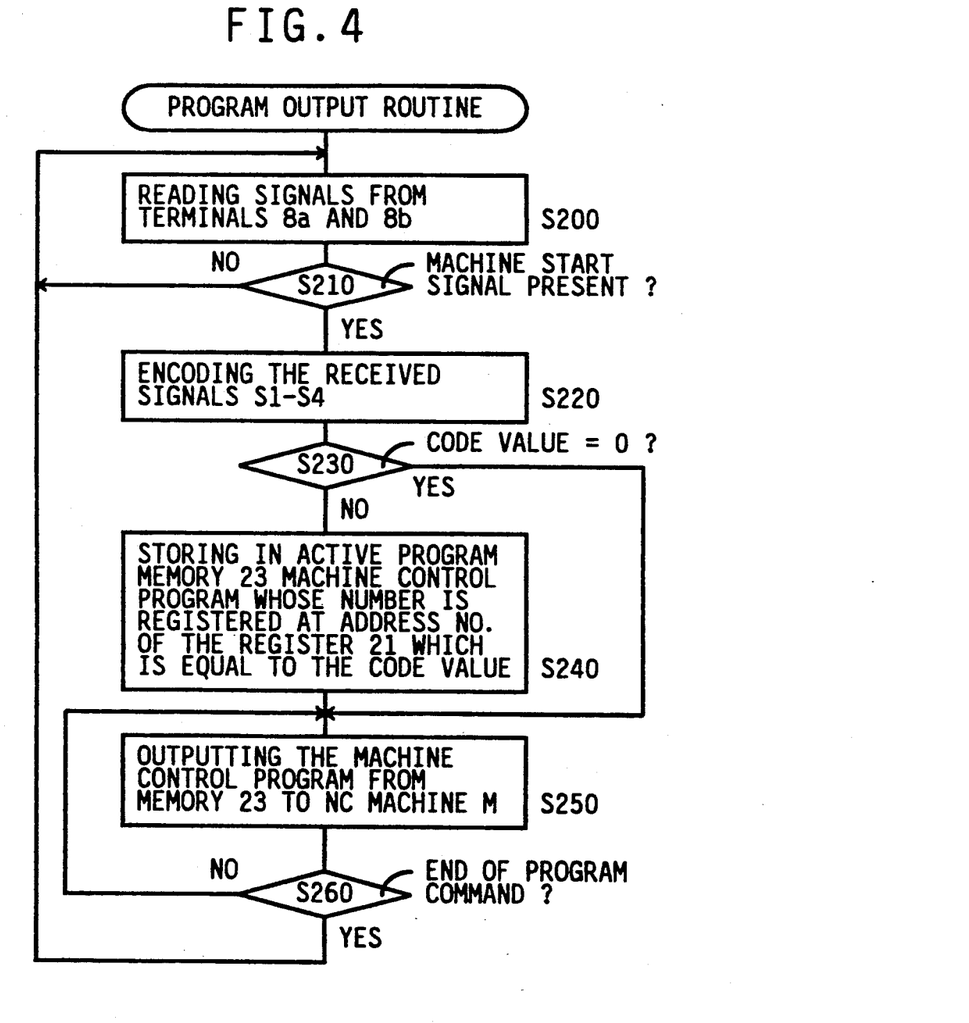
FIG. 4 is a flow chart illustrating a program output routine for outputting a selected machine control program to a numerically controlled machine.
Figure 5:
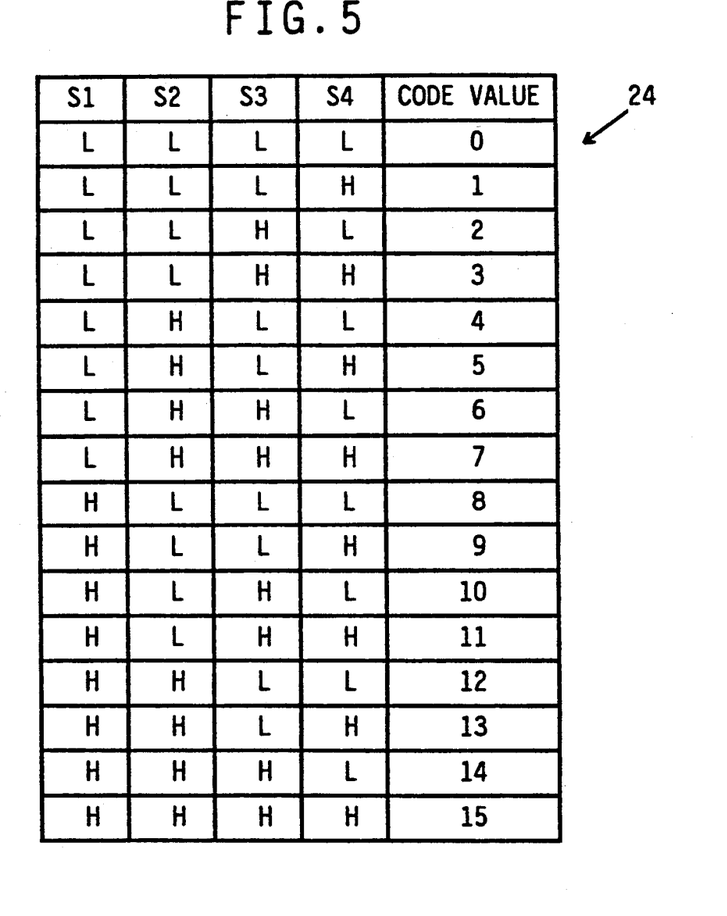
FIG. 5 is a view showing a data map for encoding program selection signals into code values indicative of various machine control programs.

The ROM 3 stores various control programs according to which the CPU 1 operates to control the numerical control device 10, and a SIGNAL-CODE map 24 as shown in FIG. 5. The control programs include a program number registering routine as shown in the flow chart of FIG. 3, and a program output routine as shown in the flow chart of FIG. 4.

The operator's control panel 4 has a keyboard which includes various keys 25 including cursor keys for moving a cursor 26 on the screen of the display 5, and alphanumeric keys for permitting the operator to enter various parameters, and the program numbers of the machine control programs, for example, when the desired program numbers are correlated with the respective address numbers of the PROGRAM NUMBER register 22.

The display 5 is a cathode ray tube adapted to display the machine control programs stored in the PROGRAM memory 20, the content of the PROGRAM NUMBER register 22, various messages from the CPU 1, and data entered through the operator's control panel 4. The CRT display 5 is also used to load the PROGRAM NUMBER register 22 (correlate the desired program numbers with its address numbers) or change its content.

The CPU 1 is connected to the numerically controlled machine M through the output interface 6, so that a selected one of the machine control programs registered in the register 22 is outputted to the machine M via the ACTIVE PROGRAM memory 23, and so that various signals are fed between the CPU 1 and the machine M. The input interface 7 also connected to the CPU 1 is connected to an external sequence controller SC through the terminal board 8, for receiving signals from the sequence controller SC.

The terminal board 8 has four program selection terminals 8a, and one control terminal 8b, which terminals 8a, 8b are connected to the sequence controller SC through respective signal lines. The sequence controller SC feeds program selection signals to the program selection terminals 8a to select the machine control programs, and machine start and stop signals to the control terminal 8b to start and terminate a series of operations of the machine M. The sequence controller SC is provided with a sensor 27 for detecting the types of workpieces which are supplied to the machine M, which may constitute a part of a production line. Suitable pallets may be used to load the machine M with the workpieces. In this case, the type of the workpieces may be identified by reading suitable information provided on the pallets. The program selection signals to be fed to the terminals 8a are prepared according to the output of the sensor 27, which indicates the type of the workpiece detected.

Referring to FIG. 2, the PROGRAM NUMBER register 22 will be described. The register 22 used in this specific embodiment has a total of 16 addresses No. 0 through No. 16, at which the program numbers identifying the desired machine control programs corresponding to the workpieces that are expected to be machined or otherwise processed are registered by the operator before the numerical control device 10 and the machine M are operated to process the workpieces. The flow chart of FIG. 3 shows a program number registering routine for registering in the PROGRAM NUMBER register 22 the identification numbers of desired ones of the machine control programs which are stored in the PROGRAM memory 20 of the RAM 2.

As indicated above, the individual machine control programs are identified by the respective program numbers by the data stored in the PROGRAM NUMBERING table 21. In the present embodiment, numbers selected from 1 up to 9999 may be used as the program numbers identifying the machine control programs stored in the PROGRAM MEMORY 20. Therefore, up to 9,999 machine control programs may be stored in the PROGRAM memory 20 and retrieved by using the respective four-digit program numbers.

Figure 3:
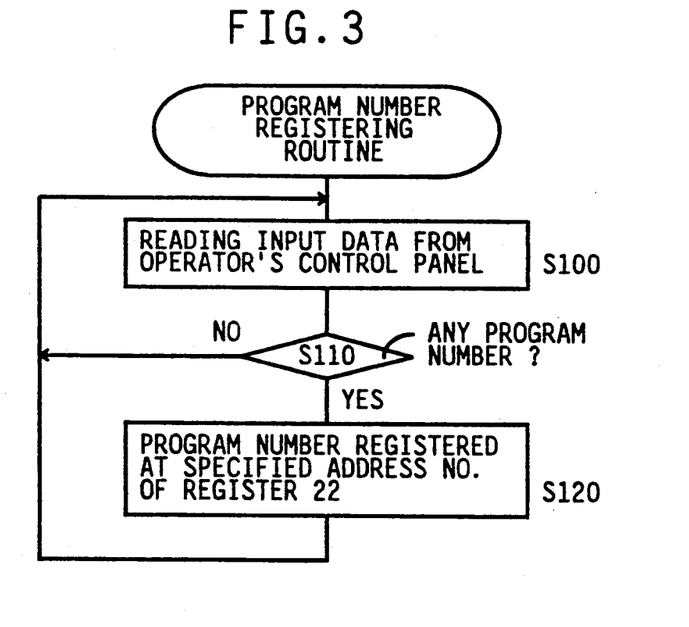
FIG. 3 is a flow chart illustrating a program number registering routine for registering machine control program numbers in the program number register of FIG. 2.

The program number registering routine of FIG. 3 is executed in a program number registering mode which is established by operating a suitable key 25 on the operator's control panel 4. When this mode is established, the content of the PROGRAM NUMBER register 22 is displayed on the CRT display 5.

The program number registering routine begins with step S100 in which input data from the operator's control panel 5 are read in. Step S100 is followed by step S110 to determine whether or not the entered data represents the program number of any machine control program stored in the memory 20. Steps S100 and S110 are repeatedly executed until any program number is entered through the operator's control panel 4. When the operator desires to register the program number of a certain machine control program, at a given address No. of the register 22, the operator moves the cursor 26 on the display 5, so that the cursor 26 indicates the appropriate address No. of the register 22, by using the cursor key 25. Then, the operator enters the program number of the desired machine control program stored in the memory 20. As a result an affirmative decision (YES) is obtained in step S110.

If the affirmative decision (YES) is obtained in step S110, the control flow goes to step S120 in which the entered program number is stored at the address No. of the register 22 designated by the cursor 26 on the display 5, when a suitable key 25 on the panel 4 is depressed by the operator. Step S120 is followed by step S100, whereby the program number of the next desired machine control program can be registered in the register 22, in the same manner as described above.

In the present example, the address Nos. 1 through 7 of the register 21 are used for registering the corresponding seven machine control programs, which are stored in the PROGRAM memory 20 and which correspond to the types of workpieces that are highly expected to be machined or otherwise processed. The content of the PROGRAM NUMBER register 22 can be changed or updated from time to time, depending upon the types of the workpieces to be processed. For the reason which will be described, the address No. 0 of the register 22 is not used for registering the program numbers.

Referring next to the flow chart of FIG. 4, there will be described a program output routine for outputting a selected one of the registered machine control programs, to the numerically controlled machine M, in response to the signals received by the terminal board 8. This routine is initiated by operating a suitable key 25 on the operator's control panel 4.

Initially, step S200 is implemented to read the signals from the external sequence controller SC. Step S200 is followed by step S210 to determine whether the signal received by the terminal board 8 is the machine start signal, namely, whether the level of the signal received at the control terminal 8b is high (H) or not. Steps S200 and S210 are repeatedly executed until the machine start signal is received from the sequence controller SC. If an affirmative decision (YES) is obtained in step S210 with the machine start signal received at the control terminal 8b, the control flow goes to step S220 in which the program selection signals S1, S2, S3 and S4 currently received at the respective program selection terminals 8a are encoded into a corresponding code value, as described below.

The SIGNAL-CODE map 24 in the ROM 3 stores data representing a relationship as indicated in FIG. 5, between 16 different combinations of the low (L)/high (H) levels of the four program selection signals S1-S4, and the corresponding 16 code values which in turn correspond to the 16 address Nos. 0-15 of the PROGRAM NUMBER register 22 of the RAM 21. For example, the combination of the L, L, H and H levels of the four signals S1, S2, S3 and S4, respectively, is encoded into a code value "3", while the combination of the L, H, L and H levels of the signals S1, S2, S3 and S4, respectively, is encoded into a code value "5". In the present example wherein the number of the signal selection terminals 8a provided at the terminal board 8 is equal to "4", a total of 16 code values "0" through "15" are assigned to the respective 16 different combinations of the low/high (L/H) levels of the four signal selection signals S1-S4 received at the respective signal selection terminals 8a.

The control flow then goes to step S230 to determine whether or not the code value obtained in step S220 is zero ("0"). If the obtained code value is not "0" (if a negative decision "NO" is obtained in step S230), step S240 is implemented wherein the CPU 1 reads one of the program numbers which is stored at the address No. of the PROGRAM NUMBER register 22 which is equal to the relevant code value, and then reads outs from the PROGRAM memory 20 the machine control program whose number has been read. The read-out program is stored in the ACTIVE PROGRAM memory 23 of the RAM 2 as an active machine control program, together with data used for the active machine control program, such as various sub-routines performed in a machining cycle according to the active machine control data. Step S240 is followed by step S250 wherein the active machine control program which has been stored in the memory 23 is sequentially fed to the numerically controlled machine M, so that the machine M is operated to process the workpiece according to the active machine control program. The active machine control program is not outputted directly from the PROGRAM memory 20, but is once stored in the ACTIVE PROGRAM memory 23 since other data such as the sub-routines indicated above are also outputted according to the active machine control data.

Step S250 is followed by step S260 to determine whether or not an end of program command (e.g., M30) at the end of the machine control program has been outputted. Steps S250 and S260 are repeatedly implemented until an affirmative decision (YES) is obtained in step S260. The machine control program corresponding to the code value obtained in S220 is terminated with the affirmative decision obtained in step S260. The control flow then goes back to step S200, waiting for the entry of the machine stop signal or program selection signals S1–S4 at the terminals 8b, 8a.

If an affirmative decision (YES) is obtained in step S230, that is, if the code value obtained in step S220 is "0", the control skips step S240, and executes step S250 in which the machine control program used for the last operation cycle of the machine M, i.e., the active machine control program currently stored in the ACTIVE PROGRAM memory 23 is again outputted to the machine M, to perform the same machining or other processing operation on the same type of workpiece. In other words, the sequence controller SC is adapted to generate the program selection signals S1–S4 whose levels are all low (L), if the type of the workpiece currently detected by the sensor 27 is the same as that of the workpiece which has been processed in the last operation cycle, namely, if the current output of the sensor 27 is the same as the last output prior to the last operation cycle of the machine M. Therefore, the code value "0" is obtained in step S220 if two or more workpieces of the same type are successively machined or otherwise processed by the machine M. This arrangement saves the time spent in step S240 for reading the specified machine control program in the memory 20 and storing it in the memory 23.

The program output routine of FIG. 4 is terminated when a suitable key 25 on the operator's control panel 4.

In the present numerical control device 10, the terminal board 8 does not receive the program selection signals which directly represent the program number of the machine control program for the workpiece detected by the sensor 27 of the sequence controller SC. Instead, the RAM 2 is provided with the PROGRAM NUMBER register 22 in which only the desired machine control programs which are highly expected to be used or which will be actually used are registered in relation to the respective code values assigned thereto, so that the code values correspond to the combinations of the states of only four program selection signals S1–S4 received from the sequence controller SC. Although the conventional arrangement requires 14 program selection signals and the corresponding 14 signal lines and program selection terminals where the program numbers 0 through 9999 are available, the present arrangement requires only four program selection signals S, S2, S3 and S4, whereby the required numbers of the signal lines and the program selection terminals are accordingly reduced. If the SIGNAL-CODE map 24 as indicated in FIG. 5 is provided in the ROM 3, the levels of the four program selection signals S1–S4 which are generated by the sequence controller SC and received by the respective terminals 8a are set to be "L", "H", "L" and "H", respectively, which combination corresponds to the code value "5", for example, if it is desired to use the machine control program whose number is "4825" registered at the address No. 5 of the register 21, which corresponds to the code value "5". In other words, if it is desired to select the program number "4825" when the levels of the signals S1–S4 received at the terminals 8a are "L", "H", "L" and "H", respectively, the program number "4825" must be registered at the address No. 5 of the register 21 where the SIGNAL-CODE map 24 as indicated in FIG. 5 is provided in the ROM 3.

According to the present numerical control device 10, machine control programs are identified by respective 4-digit numbers, and only those of the machine control programs which are actually used or frequently used for a given period of time are registered in the PROGRAM NUMBER register 22. The use of the 4-digit program identification numbers not only permits the use of many program identification numbers for many NC machines, allowing the currently used machine control programs to be distinguished from the old machine control programs which were previously frequently used but are less likely to be used, but also allows for simplification and reduced cost of the system including the terminal board, signal line cables and connectors, since the required number of the program selection signals need not correspond to the largest program number available ("9999" in the illustrated example), but corresponds to the number of the machine control programs which are registered in the register 22.

While the present invention has been described in detail in its presently preferred embodiment, it is to be understood that the invention is not limited to the details of the illustrated embodiment, but may be embodied with various changes, modifications and improvements, without departing from the spirit and scope of the invention defined in the following claims. For example, the number of the program selection terminals 8a may be suitably changed, depending upon the number of digits used for identifying the machine control programs and the number of the machine control programs which are expected to be registered in the register 22.

What is claimed is:

1. A control device for outputting to a workpiece processing machine a selected one of machine control programs in response to program selection signals received from an external device, comprising:
   a program memory for storing a plurality of machine control programs, in relation to respective program numbers which identify said machine control programs, respectively;
   a signal input portion having a plurality of program selection terminals for receiving respective program selection signals from said external device;
   correlating means for correlating said program numbers of selected ones of said machine control programs with respective code values corresponding to respective combinations of states of said program selection signals, the number of said code values and the number of said selected ones of said machine control programs being smaller than the number of said program numbers and the number of said machine control programs, respectively;

correlation memory means for storing a relationship between said program numbers of said selected ones of the machine control programs and said code values which are obtained by said correlating means;

encoding means for encoding the combination of states of said program selection signals which are received at said program selection terminals, into a corresponding one of said code values;

program number reading means for reading one of said program numbers which corresponds to said corresponding one code value obtained by said encoding means; and program output means for outputting to said machine one of said selected ones of said plurality of machine control programs, whose program number has been read by said program number reading means.

2. A control device according to claim 1, further comprising an active program memory for storing as an active machine control program the machine control program whose number is read by said program number reading means, and transferring means for transferring said machine control program whose number is read by said program number reading means, from said program memory to said active program memory, said program output means outputting said active machine control program from said active program memory to said machine.

3. A control device according to claim 1, wherein said code values includes a special code value which is not correlated to any of said program numbers of said selected ones of said machine control programs, said control device further comprising output control means operable when said special code value is obtained by said encoding means, for inhibiting an operation of said program number reading means, and commanding said program output means to output one of said machine control programs whose program number corresponds to the code value obtained just before said special code value is obtained.

4. A control device according to claim 1, wherein said signal input portion further has a control terminal for receiving an encoding start signal for commanding said encoding means to start encoding the combination of states of the program selection signals currently received at said program selecting terminals.

5. A control device according to claim 1, wherein said external device to which said program selection terminals of said signal input means is connected is provided with a sensor for detecting a type of a workpiece currently supplied to said machine, said external device generating said program selection signals according to an output of said sensor.

6. A control device according to claim 1, wherein said correlating means comprises:

display means for indicating a content of said correlation memory means;

first designating means for designating one of said code values which is to be correlated to the program number of a desired one of said machine control programs stored in said program memory; and second designating means for entering the program number of said desired one machine control program.

7. A control device according to claim 6, wherein said display means has a cursor, and said first designating means includes a cursor key for moving said cursor to indicate said one of the code values indicated on said display means, said second designating means including keys for entering the program number of said desired one machine control program, and a key for correlating the entered program number to the code value indicated by said cursor.

8. A control device according to claim 1, wherein said encoding means includes a data map indicative of said respective combinations of states of said program selection signals and said respective code values, and code reading means for reading one of said code values which corresponds to the combination of states of said program selection signals received at said signal input terminals.

9. A control device according to claim 1, wherein the number of said plurality of program selection terminals for receiving said respective program selection signals is smaller than the number of bits necessary to represent said program numbers.

10. A workpiece processing system comprising:

a machine operable to process workpieces according to machine control programs; and a control device for outputting to said machine a selected one of the machine control programs in response to program selection signals received from an external device, comprising:

a program memory for storing a plurality of machine control programs, in relation to respective program numbers which identify said machine control programs, respectively;

a signal input portion having a plurality of program selection terminals for receiving respective program selection signals from said external device;

correlating means for correlating said program numbers of selected ones of said machine control programs with respective code values corresponding to respective combinations of states of said program selection signals, the number of said code values and the number of said selected ones of said machine control programs being smaller than the number of said program numbers and the number of said machine control programs, respectively;

correlation memory means for storing a relationship between said program numbers of said selected ones of the machine control programs and said code values which are obtained by said correlating means;

encoding means for encoding the combination of states of said program selection signals which are received at said program selection terminals, into a corresponding one of said code values;

program number reading means for reading one of said program numbers which corresponds to said corresponding one code value obtained by said encoding means; and program output means for outputting to said machine one of said selected ones of said plurality of machine control programs, whose program number has been read by said program number reading means.

11. A system according to claim 10, wherein the number of said plurality of program selection terminals for receiving said respective program selection signals is smaller than the number of bits necessary to represent said program numbers.

* * * * *